June 22, 1926.
A. LUCAS
1,589,977
ELECTRODE HOLDER CUT-OUT FOR WELDING TOOLS
Filed Oct. 15, 1923
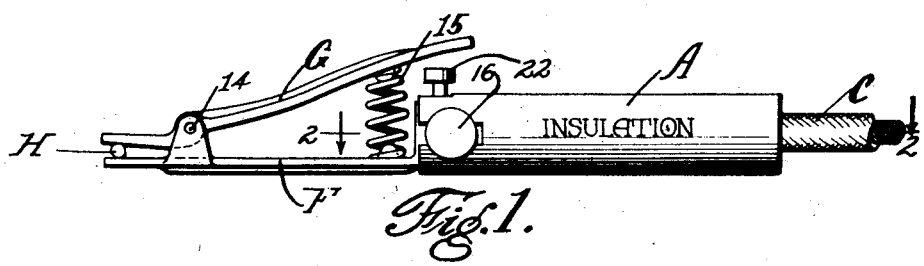
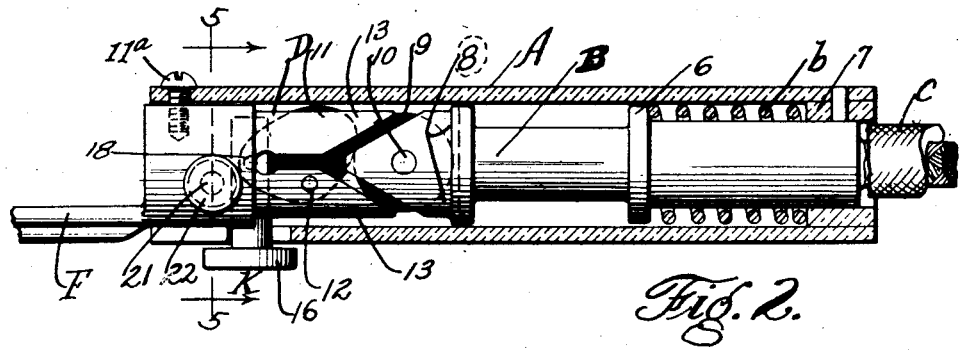
INVENTOR
Andrew Lucas;
BY
ATTORNEYS Patented June 22, 1926.

1,589,977

UNITED STATES PATENT OFFICE.

ANDREW LUCAS, OF LOS ANGELES, CALIFORNIA.

ELECTRODE-HOLDER CUT-OUT FOR WELDING TOOLS.

Application filed October 15, 1923. Serial No. 668,660.

This invention relates to electrode holder cut-outs for welding tools particularly such welding tools as are employed for welding rail joints of electric railways; and has for its particular object the provision of means whereby the electrical path through the holder may be established or terminated at will, preferably by cut-out mechanism installed in the handle portion of the holder. Other objects consist in the provision of improved cut-out means and electrode holder with such cut-out means, in combination, which will be superior in point of relative simplicity and inexpensiveness, taken in conjunction with positiveness, convenience and efficiency in use and service and general superiority.

With the above and other objects in view, the invention consists in the novel and useful provision, formation, construction, combination, association and relative arrangement of parts, members and features, all as hereinafter described shown in the drawing and finally pointed out in claims.

It may be stated that a particular advantage in the use of the device resides in the fact that it aids in protecting the eyes of the operator of the welding tool, in that the electrical path may be broken or opened and maintained so while handling the tool or bringing it into position for service, and until the operator's eyes have been thoroughly shielded; whereupon the electrical path may be closed or established and the welding operation proceeded with. In the use of ordinary devices of this character frequently an arc is inadvertently drawn, and such arc, with the heavy voltage employed, often seriously damages the eyes of operators.

In the drawing:

Figure 1 is a side elevation of an electrode holder and cut-out for welding tools, the conductor to the holder being shown in fragment;

Figure 2 is a longitudinal vertical sectional view thereof, particularly in plan, and taken upon the lines 2—2, Figure 1, and looking in the direction of the appended arrows;

Figure 3 is a fragmentary view similar to Figure 1, with a further sectional showing, the electrical path being open;

Figure 4 is a view similar to Figure 3, the electrical path being closed; and,

Figure 5 is a detail transverse sectional view, partly broken away, taken upon the line 5—5 of Figure 2.

Figures 2, 3, 4 and 5 are upon an enlarged scale.

Corresponding parts in all the figures are designated by the same reference characters.

Referring with particularly to the drawing, I have shown at A the tubular handle portion of an electrode holder within which is movably mounted a reciprocating circuit member B normally urged toward the forward end of the handle member by a surrounding coil spring $b$ bearing against an annular flange 6 on such member B and against an annular plug 7 at one end of the handle portion. Connected with such circuit member is an insulated electrical conductor C. The forward end of such member B is bifurcated and between the furcations 8 is mounted an insulating roller 9, the same being mounted upon a transverse pin 10 spanning the space between such furcations 8. Another circuit member D is fixed in the forward end of the handle member A, as by a screw 11$^a$, and the same is provided with furcations 13 between which is mounted an insulating cam 11, the latter being mounted upon a similar pin 12 spanning the space between such furcations 13. Electrically connected with and preferably integral with the member D and ranging forwardly thereof, is an electrode holder member F with which is pivotally connected as at 14 a further electrode holder member G, between which an electrode H is adapted to be gripped under compression of a coil spring 15 disposed between such members F and G adjacent to the forward end of the handle member A. K designates operating means for the insulating cam 11 and to relatively move the circuit members B and D, the same comprising a finger-piece 16 having a bifurcated shank or stem 17 straddling the forward portion of the insulating cam 11 and loosely pinned thereto as at 18, and having a lateral recess or notch 19 in its forward side, adapted to receive a locking head 20 fast upon a stem 21 of a button or finger-piece 22 urged outwardly by a compression coil spring 23, such spring being housed in a chamber 24 at the lower portion of the circuit member D and confined within the handle member A, one end of such spring being received within the chamber in the locking head 20, which locking head is adapted to play with its stem vertically of the handle portion in a bore 25 in the circuit member D, such bore having a countersunk or enlarged portion 25ª forming a shoulder 25ᵇ against which such locking head 20 is stopped, when in position to enter the recess 19. Normally the head rests against one of the furcations of the stem 17, and beneath the stem, as shown in Figure 4, the stem 17 playing transversely of the circuit member D in an enlarged bore 26 registering with an elongated slot 27 in the tubular handle member A, so that the stem 17 can swing upon the pin 18; and the bores 26 and 25 communicate. When the button 16 is in outwardly projecting position, as shown in Figure 4, such pin 21 is in its inward position, with its finger-piece 22; but, when the finger-piece 16 is so inclined to swing the insulating cam 11 from the position shown in Figure 4 to the position shown in Figure 3, to operate upon the insulating roller 9, and move the circuit member B against the compression of the spring b, the notch 19 finally comes into position so that the head 20 can enter such notch, and it so does, the stem 21 being moved endwise by the compression of the spring 23. It now holds the shank or stem 17 in the position shown in Figure 3, holding the circuit members B and D apart, with the electrical path through the electrode holder terminated or broken, so that the tool is safe to handle without the passage of electrical energy through the holder member F. In order to release the circuit member B and permit such member to be restored to the position shown in Figure 4 to again establish an electrical path through the circuit members B and D, the button or finger-piece 22 is depressed, moving the locking head 20 out of the notch 19, whereupon the spring b forces the circuit member B forwardly, closing the electrical path through the members B and D and moving the stem 17 and its finger 16 outwardly into the position shown in Figure 4; and when the button 22 is again released the head 20 will come up under the shank 17 again into the position shown in Figure 4. Subsequent pressure upon the button 16 will cause a subsequent locking of the circuit members with the electrical path open, as shown in Figures 2 and 3, in the manner described, and further subsequent pressure upon the finger-piece 22 will again release the button 16 and the connected parts so that the electrical path will be closed again, the locking head 20 taking up its position beneath the shank 17, as shown in Figure 4.

In these actions the insulating cam 11 rides over and rotates the insulating roller 9, resulting, in conjunction with the action of the spring b, in reciprocation of the movable circuit member B. It will be noted that the entire cut-out mechanism is mounted at the zone of the handle member A, which is grasped by the hand of the operator manipulating the welding tool, and that by shifting his thumb the operator may alternately manipulate the button or finger-pieces 16 and 22 to control the energization or de-energization of the tool, and may thus prepare the conditions relative to protection of his eyes and with respect to rendering the welding tool operative or inoperative, or in substituting fresh electrodes, as is desired or may be required.

It is obvious that various changes and variations and modifications may be made in practicing the invention, in departure from the foregoing description and the disclosure of the drawing, without departing from the true spirit of the invention.

Having thus disclosed my invention, I claim and desire to secure by Letters Patent:

1. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said means including a further circuit member movably mounted in connection with such handle member, means for moving such further circuit member, and means for releasably locking such last named means in operative position.

2. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction.

3. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such circuit member in one direction, and locking means for releasably holding such push button in one direction; means being provided yieldingly urging said last named circuit member into circuit closing position.

4. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; means being provided yieldingly urging said last named circuit member into circuit closing position; said locking means comprising a further push button cooperating with said first named push button.

5. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; means being provided yieldingly urging said last named circuit member into circuit closing position; said locking means comprising a further push button cooperating with said first named push button; means being provided yieldingly urging said second push button toward locking position.

6. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; there being an eccentric device movably mounted in connection with said first named circuit member and cooperating with said second named circuit member and operatively connected with said push button.

7. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; there being an eccentric device movably mounted in connection with said first named circuit member and cooperating with said second named circuit member and operatively connected with said push button; said second named circuit member having a roller member with which said cam cooperates.

8. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; there being an eccentric device movably mounted in connection with said first named circuit member and cooperating with said second named circuit member and operatively connected with said push button; said second named circuit member having a roller member with which said eccentric member cooperates; said eccentric member and said roller member being of insulating material.

9. A device of the character disclosed, comprising a circuit member through which electrical energy may be applied to work, a handle member for such circuit member, and means associated with the handle member for passing electrical energy to such circuit member; means likewise being associated with the handle member controlling such passage of such electrical energy; said last named means including a further circuit member movably associated with the handle member, a push button for operating such further circuit member in one direction, and locking means for releasably holding such push button in one direction; means being provided yieldingly urging said last named circuit member into circuit closing position; said locking means comprising a further push button cooperating with said first named push button; said first named push button having a recess adapted to be entered by a locking head upon said second named push button.

10. In a device of the character disclosed, two relatively movable circuit members, means normally urging the same into contact, cam means for relatively separating said members, and means for releasably locking said cam means to maintain separation of the relatively movable circuit members.

11. In a device of the character disclosed, two relatively movable circuit members, means normally urging the same into contact, cam means for relatively separating said members, and means for releasably locking said cam means to maintain separation of the relatively movable circuit members, said cam means being provided with an operating push button, and said locking means comprising a further push button cooperating with said first named push button.

12. In a device of the character disclosed, two relatively movable circuit members, means normally urging the same into contact, cam means for relatively separating said members, and means for releasably locking said cam means to maintain separation of the relatively movable circuit members, said cam means being provided with an operating push button, and said locking means comprising a further push button adapted to interlock with said first named push button in one position; means likewise being provided urging said second named push button into locking position.

In testimony whereof, I have signed my name to this specification.

ANDREW LUCAS.